S. F. JONES.
MACHINE FOR REMOVING BOLL WEEVILS.
APPLICATION FILED APR. 19, 1912.
1,086,057.
Patented Feb. 3, 1914.
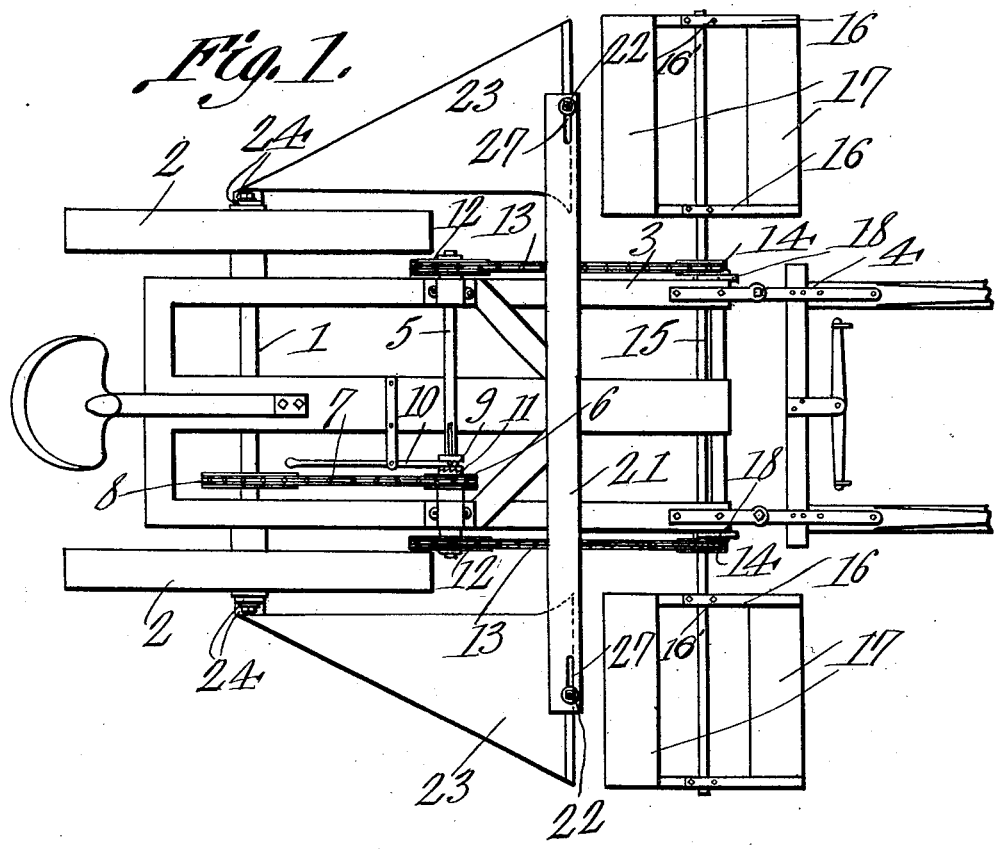
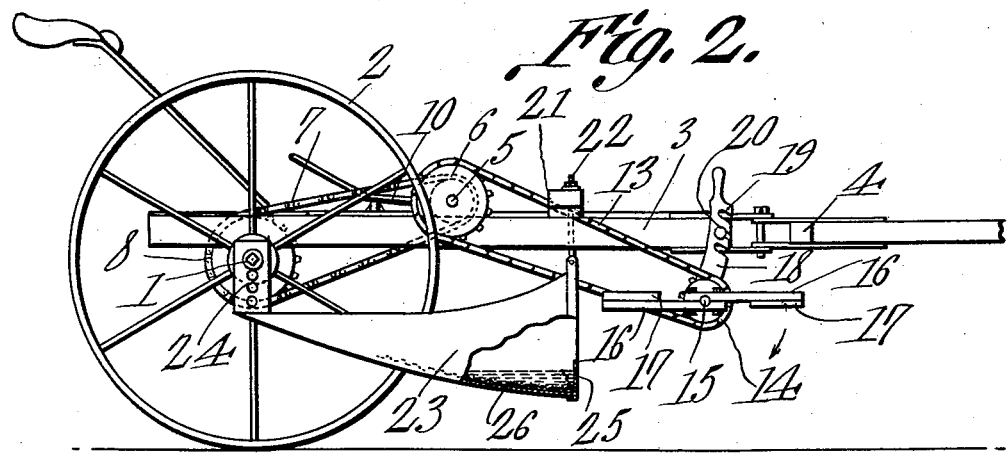

UNITED STATES PATENT OFFICE.

STEPHEN FRANKLIN JONES, OF NEAR GREENWOOD, MISSISSIPPI.

MACHINE FOR REMOVING BOLL-WEEVILS.

1,086,057. Specification of Letters Patent. Patented Feb. 3, 1914.

Application filed April 19, 1912. Serial No. 691,902.

*To all whom it may concern:*

Be it known that I, STEPHEN F. JONES, a citizen of the United States, residing near Greenwood, in the county of Leflore and State of Mississippi, have invented a new and useful Machine for Removing Boll-Weevils, of which the following is a specification.

This invention relates to a machine for gathering and destroying boll weevils.

It is well known that when the cotton plants are young the first boll weevils feed upon the buds at the tops of the plants. It has been found that by removing the weevils from the young plants, better results are obtained than where the removal is deferred until the plants are older.

It is the object of the present invention to gather the boll weevils from the young plants, the gathering mechanism being adjustable so as to properly operate upon plants of different heights.

A further object is to provide improved means for removing the boll weevils from the plants and for collecting and destroying them.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings Figure 1 is a plan view of the machine. Fig. 2 is a side elevation thereof, a portion of one of the collectors being shown in section.

Referring to the figures by characters of reference 1 designates the drive axle of the machine, the same being supported by wheels 2 one of which is keyed or otherwise secured to the axle while the other is loosely mounted thereon, thus permitting the machine to be easily turned within a small compass. A frame 3 is supported by the axle 1 and extends forward to thills 4 whereby the structure can be drawn by a draft animal. It is to be understood that instead of utilizing thills, however, a motor propelled vehicle may be employed for drawing the machine or, if desired, the machine can be actuated in any other manner preferred. A counter shaft 5 is journaled on the frame 3 and a sprocket 6 is loosely mounted thereon and receives motion, through a chain 7, from a sprocket 8 secured to the axle 1. A clutch member 9 is feathered on the shaft 5 and has a controlling lever 10 whereby it can be shifted into or out of engagement with a clutch member 11 carried by the sprocket 6. Sprockets 12 are secured to the end portions of shaft 5 and each of these sprockets transmits motion through a chain 13 to another sprocket 14 secured to a shaft 15 extending transversely of and laterally beyond the frame 3. Connected to the end portions of the shaft 15 are radial arms 16 carrying blades 17 preferably arranged in pairs and which are parallel with the shaft 15. Shaft 15 is preferably journaled in hangers 18 having notches 19 therein any one of the notches 19 in each hanger being adapted to receive a supporting stud 20 extending from the frame 3. It will be understood that by providing this arrangement of notches the hangers 18 can be adjusted upwardly or downwardly so as to bring the shaft 15 to any elevation desired.

Arms 16 are preferably clamped on shaft 15 by bolts 16' and can thus be adjusted along the shaft so as to bring the blades 17 any desired distances apart, thus to adapt the machine for use along rows different distances apart.

A bar 21 extends transversely of the frame 3 and laterally beyond the sides thereof and adjustably engaging the end portions of this bar are stems 22 extending upwardly from the open front ends of receivers or collectors 23, which, as shown, preferably taper toward their rear ends where they are provided with hangers 24 suspended from and adjustably connected to the end portions of the axle 1. A retaining flange 25 extends across the front or open end of each receiver at the bottom thereof and mounted within each receiver and back of the flange is a removable tray 26, preferably formed of wire fabric. The space back of the flange 25 is adapted to be partly or entirely filled with insecticide.

As shown in Fig. 1 the front or open ends of the receivers 23 extend practically throughout the width of the path traveled by the blades 17. Thus it will be seen, that as the machine moves forward, the blades 17 will be caused successively to strike the tops of the young plants and to knock the weevils therefrom and rearwardly into the open ends of the receivers. The insects will thus be deposited in the insecticide and be killed. By removing the tray 26, the receiver in which it is mounted will be quickly cleaned of accumulated insects.

By referring to Fig. 1 it will be seen that the bar 21 has longitudinal slots 27 through which the stems 22 extend. Thus it will be seen that the receivers 23 can be swung toward or from each other so as to be properly positioned relative to the blades 17 subsequent to the lateral adjustment of the blades along the shaft 15. By means of lever 10 the operation of the blades can be controlled.

What is claimed is:—

1. A machine of the class described including a wheel supported structure, an elongated insect receiver at each side thereof, said receiver being open at its front end and closed at its rear end, means for connecting the rear ends of the receivers to the structure for vertical adjustment, a cross bar carried by the structure, the ends of the bar extending over the insect receivers, means adjustably connecting said receivers to the cross bar for lateral adjustment, said means coöperating with the bar to hold the receivers against movement after adjustment, a transverse shaft, separate beaters revoluble therewith in front of the respective insect receivers, and means for transmitting motion to the beaters from the supporting wheels.

2. A machine of the class described including a wheel supported structure, an elongated insect receiver at each side thereof, said receiver being open at its front end and closed at its rear end, means for connecting the rear ends of the receiver to the structure for vertical adjustment, a cross bar carried by the structure, the ends of the bar extending over the insect receivers, means adjustably connecting said receivers to the cross bar for lateral adjustment, said means coöperating with the bar to hold the receivers against movement after adjustment, a transverse shaft, separate beaters revoluble therewith in front of the respective insect receivers, means for transmitting motion to the beaters from the supporting wheels, means for adjusting said shaft upwardly and downwardly, and means for adjusting the beaters longitudinally of the shaft to position them directly in front of the receivers.

3. A machine of the class described including a wheel supported axle, a structure carried thereby, elongated insect receivers open at their front ends and closed at their rear ends, said structure and wheels being suspended between the receivers, upstanding means at the rear ends of the receivers and supported by the axle for vertical adjustment, a cross bar supported by the structure and extending at its ends over the front ends of the receivers, means connecting the front ends of the receivers to the bar for lateral adjustment relative to the structure, a transverse shaft journaled on the structure, separate beaters revoluble therewith in front of the respective receivers and adjustable longitudinally of the shaft, and means for transmitting motion to said shaft from the axle.

4. A machine of the class described including a wheel supported structure, a vertically adjustable transverse shaft supported by the structure, a beater carried by and adjustable longitudinally of the shaft, an insect receiver open at its front end and closed at its rear end, means for connecting the rear end of the receiver to the structure for vertical adjustment relative to the structure, and means for connecting the open front end of said receiver to said structure for lateral adjustment relative to said structure.

5. A machine of the class described including a wheel supported axle, a structure carried thereby, a cross bar supported by the structure and having longitudinal slots in the end portions thereof, a receiver beyond each side of the structure, means extending upwardly from the rear end of each receiver for adjustably engaging the axle, said means being adjustable vertically, means extending upwardly from the front end of each receiver and through the slotted portion of the cross bar for supporting said front end of the receiver and adjusting it laterally, a transverse shaft adjustable vertically and carried by the structure, and beaters upon the end portions of the shaft and in front of the receivers, said beaters being adjustable longitudinally along the shaft, the front end of each receiver being open.

In testimony that I claim the foregoing as my own, I have hereto affixed my signature in the presence of two witnesses.

STEPHEN FRANKLIN JONES.

Witnesses:
J. F. DEAN, Jr.,
F. C. WAGNE.